United States Patent [19]

Wieme

[11] 4,420,523
[45] Dec. 13, 1983

[54] ENERGY-ABSORBING LAMINATE

[75] Inventor: André Wieme, Zwevegem, Belgium

[73] Assignee: N. V. Bekaert S.A., Zwevegem, Belgium

[21] Appl. No.: 460,165

[22] Filed: Jan. 24, 1983

[30] Foreign Application Priority Data

Feb. 1, 1982 [BE] Belgium .............................. 1/10411

[51] Int. Cl.³ .............................................. B32B 5/12
[52] U.S. Cl. ..................................... 428/109; 280/610;
428/108; 428/110; 428/292; 428/294; 428/295;
428/465
[58] Field of Search ............... 428/108, 109, 110, 181,
428/292, 294, 295, 465; 280/610

[56] References Cited

U.S. PATENT DOCUMENTS

| | | | |
|---|---|---|---|
| 3,515,621 | 6/1970 | Watson | 428/108 |
| 4,052,524 | 10/1977 | Haraas et al. | 428/295 |
| 4,219,601 | 8/1980 | Inoue et al. | 428/295 |
| 4,272,578 | 6/1981 | Schegerin | 428/295 |
| 4,278,726 | 7/1981 | Wieme | 428/246 |
| 4,378,041 | 3/1983 | Tsurunga et al. | 428/295 |

*Primary Examiner*—James J. Bell
*Attorney, Agent, or Firm*—Edward J. Brenner

[57] ABSTRACT

The invention relates to an energy-absorbing laminate with improved torsion strength, particularly a ski, comprising a rigid core which is covered on at least part of its plane surfaces with a grid structure (2). The grid structure comprises a number of series of parallel elastomer strips (4, 5) which are reinforced with twisted filament bundles (3) running in the longitudinal direction of the strips. The series of strips intersect each other at an angle α between 10° and 120° and are bonded to one another in the common contact areas (6).

6 Claims, 5 Drawing Figures

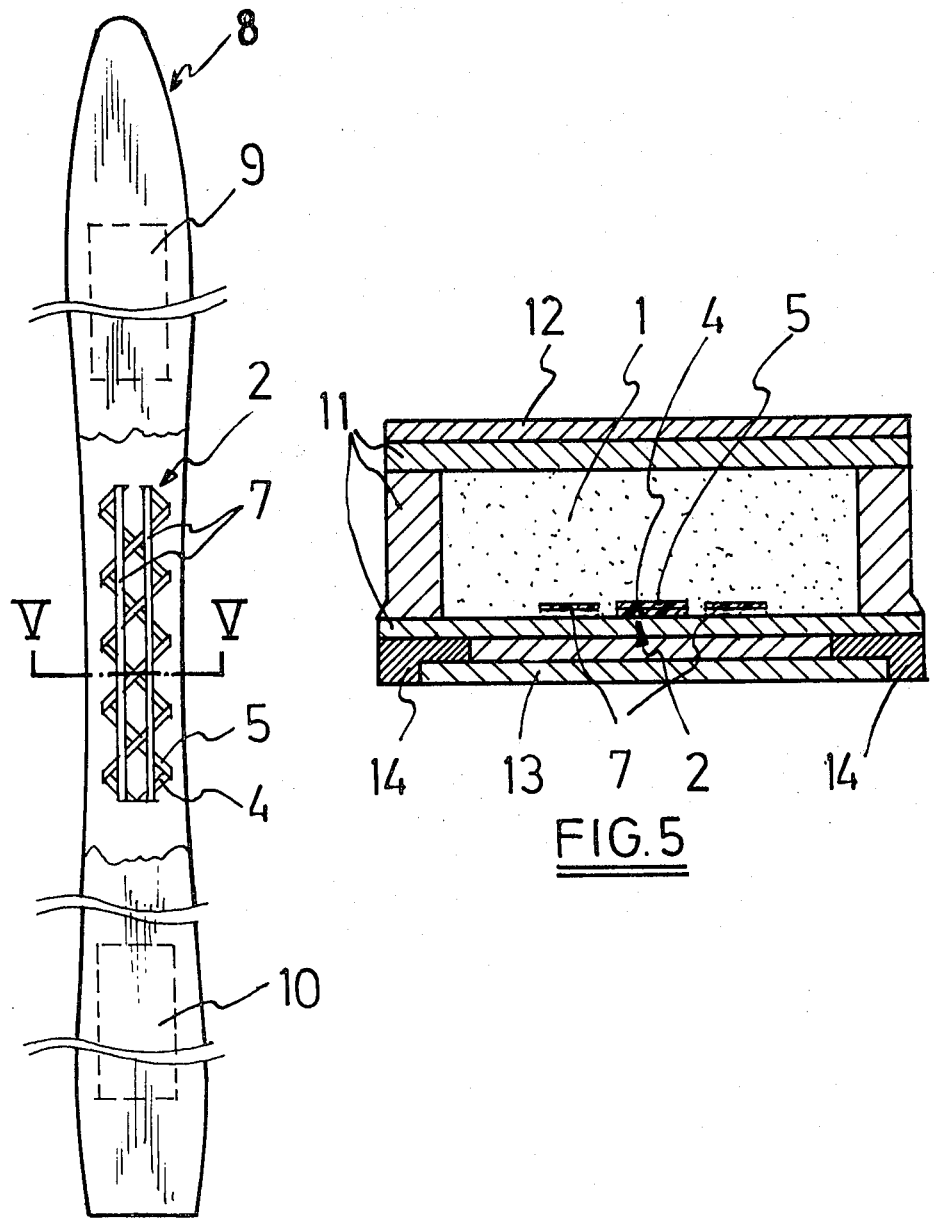

ENERGY-ABSORBING LAMINATE

This invention relates to a laminate which is capable of dampening the mechanical vibration energy generated in it, as well as to plate-shaped objects comprising such a laminate, in particular a ski.

BACKGROUND OF THE INVENTION

Energy-absorbing laminates, resp. skis comprising such laminates are known from U.S. Pat. No. 4,278,726, resp. German Patent Application No. 2.941.436, both in the name of applicant. The laminates described comprise at least one layer of rigid material, e.g. a plate or slat, of which at least one of the plane sides and on at least a part of their plane surface are covered with an elastomer layer in which twisted fiber bundles are embedded. In the ski described in the abovementioned German Patent Application, the fiber bundles in the elastomer layer are oriented in the longitudinal direction of the ski. The thus reinforced elastomer strip is applied near the upper and/or bottom surface of the ski core layer of rigid material. Owing to the incorporation of this elastomer strip, any vibrations generated during skiing (due to sliding over uneven surfaces at relatively high speed), were substantially absorbed. This considerably improved the manoeuvrability of the ski and reduced fluttering of the ski tips.

The longitudinal orientation of the fiber bundles in the elastomer layer, however, offers the disadvantage that the torsional strength of the ski along its longitudinal axis is slightly diminished.

BRIEF DESCRIPTION OF THE INVENTION

It is an object of the invention to increase the torsional strength in a laminate which is part of a plate-shaped object without exerting a detrimental influence on the dampening properties. According to the invention, therefore, the elastomer layer possesses a grid structure composed of at least two series of parallel elastomer strips reinforced with twisted fiber bundles and intersecting at an angle $\alpha$ between 10° and 120°, and which are bonded to one another in the common contact areas. The grid structure is applied at and bonded to the upper and/or bottom surfaces of the layer of rigid material, e.g. the core layer of a ski and may extend over its entire surface or a part thereof. For example, it may be advantageous and sufficient to apply grid structures in limited zones of the ski surface, for example near the ski tip, under the ski attachments, and near the aft ski end instead of applying the grid structure throughout the full ski length. The term plate-shaped object, which falls within the scope of the invention, includes a sheet, slat, profile, or a three-dimensional structure composed of these elements, such as a box or holder or framework. The twisted fiber bundles are composed of multi-filament yarns of synthetic material with a high tensile strength so as e.g. polyaramids or glass fiber or of steel wire strands or steel cords.

DETAILED DESCRIPTION

The invention will now be clarified by means of some embodiments and with reference to accompanying drawings. Hereby comparative dampening and torsional strength tests are described in order to illustrate the advantages of the grid structures.

FIG. 4 is a top plan view of a ski with incorporated grid structure, and

FIG. 5 is a cross-sectional view of FIG. 4 along the line V—V.

Figure 1:
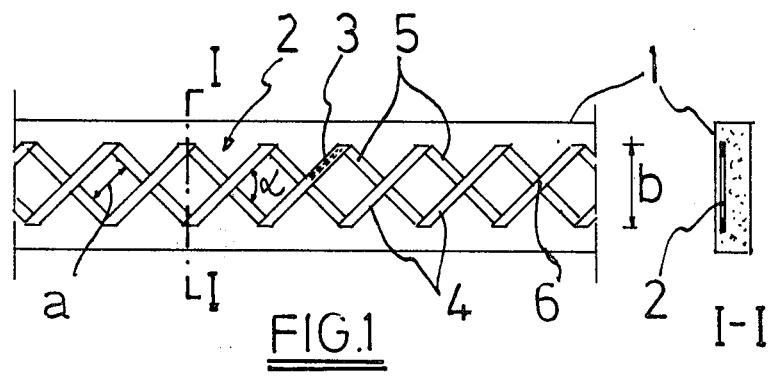
FIG. 1 is a top view and cross-sectional view of a slat covered with a grid structure according to the invention.

The energy-absorbing laminate in the form of a slat 1 shown in FIG. 1 is intended as the core layer of a ski made of stiff polyurethane foam (Baydur ®—a trademark of Bayer AG—Germany). The surface of this slat which has a width of 75 mm and a thickness of 11.6 mm is covered with a rubber layer 2 comprising twisted fiber bundles, viz. steel cords 3. This layer 2 forms a grid structure composed of two series of parallel vulcanized rubber strips 4 resp. 5 intersecting at an angle $\alpha$ of 90°.

The strips 4, 5 are vulcanized to one another in the common contact areas 6. The strips 4, 5 each have a width of 10 mm, a thickness of 0.8 mm and each comprise eight steel cords 3 with a standard construction 4×0.175 and extending along the longitudinal direction of the strip. The distance "a" between two successive parallel strips is 30 mm and the width "b" of the grid structure is 55 mm. This grid structure weighs 53 g/m. The laminate is made as follows: a grid structure is placed on the bottom of a mold with suitable dimensions and subsequently the Baydur ® foam mixture is poured on it and the mold is closed. The foaming process produces a slat with porous core and with a dense skin seizing the grid structure. The foamed structure is hardened at 60° C. for approximately 8 minutes.

In the same way, a grid structure is applied on a Baydur ® slat with the same dimensions whereby the strips are 15 mm wide and comprise 12 steel cords (4×0.175). The series 4 and 5 again intersect at an angle $\alpha$ of 90° and now the distance "a" is 23 mm. The grid structure weights 80 g/m.

Figure 2:
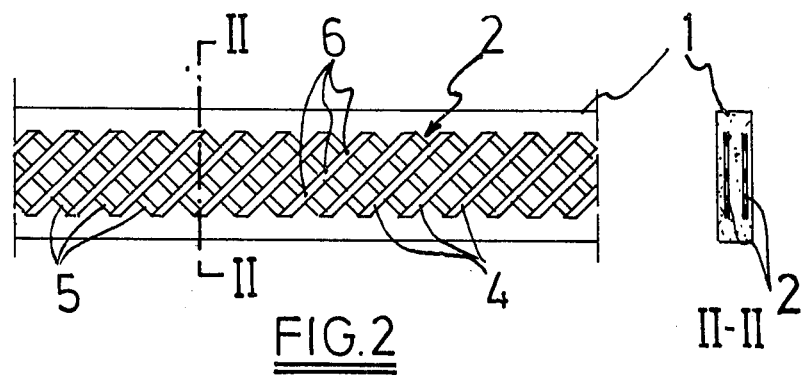
FIG. 2 is a view of a similar embodiment of a dampening laminate.

According to a third variant a grid structure as illustrated in FIG. 2 is used. The strips 4 and 5 again intersect at an angle $\alpha$ of 90° and the strip width is 10 mm. The distance "a" between successive strips is halved as compared with FIG. 1 and the number of common contact areas is doubled. This means that the grid structure weighs 106 g/m. The strips 4 and 5 form an angle of 45° to the longitudinal axis of the slat.

For the purpose of the comparative tests described hereunder three laminate variants as described above were made, but with the same grid structure both in the upper and in the bottom plane of the Baydur ® slat (see section II—II in FIG. 2). Finally, two analogous laminate variants with the same dimensions were made, whereby the grid structure was replaced by a vulcanized rubber layer 55 mm wide, 0.8 mm thick, and with a weight of 113 g/m wherein forty-four longitudinal steel cords 4×0.175 were embedded.

One of the two variants had such a rubber layer on one side, whereas the other one was provided with a steel cord reinforced rubber layer on both sides.

The eight thus prepared slats were submitted to a torsion test whereby one end was gripped and whereby at a distance of 35 cm from this end a torque moment M of 4.9 Nm was applied and the angle displacement $Q_{rad}$ was measured. On the basis of these data the shear modulus G was calculated according to the following formula:

$$G\ [N/cm^2] = \frac{M \times L}{Q_{rad} \times I_t}$$

where $I_t$ is the moment of inertia in torsion and equals $C_1 \cdot n \cdot t^4$ with $C_1 = \frac{5}{8}[1 - 0.63/n + 0.052/n^2]$, $n = 75/11.5$ (ratio of width to thickness of slat), and $t = 11.5$ cm, i.e. the slat thickness. The measuring results are summarized in the following table:

| Laminate buildup | G (N/cm²) | % increase torsional strength |
|---|---|---|
| 1. Baydur ® slat without dampening strips | 46,807.5 | 0 |
| 2. Slat with one grid structure of 53 g/m | 68,299.4 | +45.91 |
| 3. Slat with one grid structure of 80 g/m | 70,704.5 | +51.05 |
| 4. Slat with one grid structure of 106 g/m | 73,684.9 | +57.42 |
| 5. Slat with two grid structures of each 53 g/m | 85,799.1 | +83.3 |
| 6. Slat with two grid structures of each 80 g/m | 97,895.4 | +109.14 |
| 7. Slat with two grid structures of each 106 g/m | 121,672.3 | +159.94 |
| 8. Slat with one steel cord reinforced elastomer layer of 113 g/m | 41,107.6 | −12.18 |
| 9. Slat with two steel cord reinforced elastomer layers of each 113 g/m | 44,087.4 | −5.18 |

These results clearly show that the torsional strength may be considerably increased by covering the stiff slat with grid structures according to the invention. It appears, moreover, that the application of one or more longitudinally reinforced rubber layers (tests 8 and 9) does not increase the torsional strength, quite on the contrary, and despite that the weight of these layers per covered surface unit of the slat is higher than that of the grid structures. In general, it will be recommendable to select the width of the strips 4 and 5 between 20% and 120% of the distance "a" (FIG. 1) between successive parallel strips.

A number of comparative dampening tests were also conducted whereby on the one hand steelcord-reinforced rubber layers, and, on the other hand, grid structures according to the invention were affixed to an aluminium plate. The aluminium plate was gripped at one of its ends and had a free projecting length of 300 mm, a thickness of 0.8 mm, and a width of 55 mm. The free end was elastically bent by means of a force exerted perpendicularly to the plate surface and released so that the free plate end returned to its initial position while passing through a fading vibration movement. At a distance of 200 mm from the clamping line the vibration was recorded and the fading of the vibration was visualized by means of an oscilloscope. The logarithmic dampening decrement d was derived from this vibration picture and calculated according to:

$$d = \frac{1}{n-1} \ln \frac{a_o}{a_1}$$

This test was repeated on the same plate whose central zone along one side was covered with a rubber layer with a width of 35 mm, a thickness of 0.8 mm, and in which 28 steel cords extended along a direction perpendicular to the clamping line. The same aluminium plate was also covered with a grid structure of 53 g/m as described above and submitted to the same dampening test. The table below shows the d values:

| Laminate buildup | d | % increase of dampening |
|---|---|---|
| 1. Aluminum plate | 0.0062 | 0 |
| 2. Plate with a rubber layer | 0.01495 | 138 |
| 3. Plate with grid structure (53 g/m) | 0.00959 | 52.7 |

From this table it can be derived that the dampening capacity of a grid structure of 53 g/m is considerably lower than that of a longitudinally reinforced elastomer layer, but considerably higher versus an uncovered stiff plate. Therefore, the dimensions of the grid structure must be adapted to obtain an optimal combination of dampening capacity increase and torsional strength increase. For certain applications, as for skis, it will be necessary to keep the weight of the grid structure to be applied as low as possible. The application of grid structures (instead of longitudinally reinforced rubber layers) offers an additional advantage for skis, viz. not too strong an increase in stiffness. Moreover, not only the torsional strength is raised but the torsional dampening capacity as well.

Figure 3:
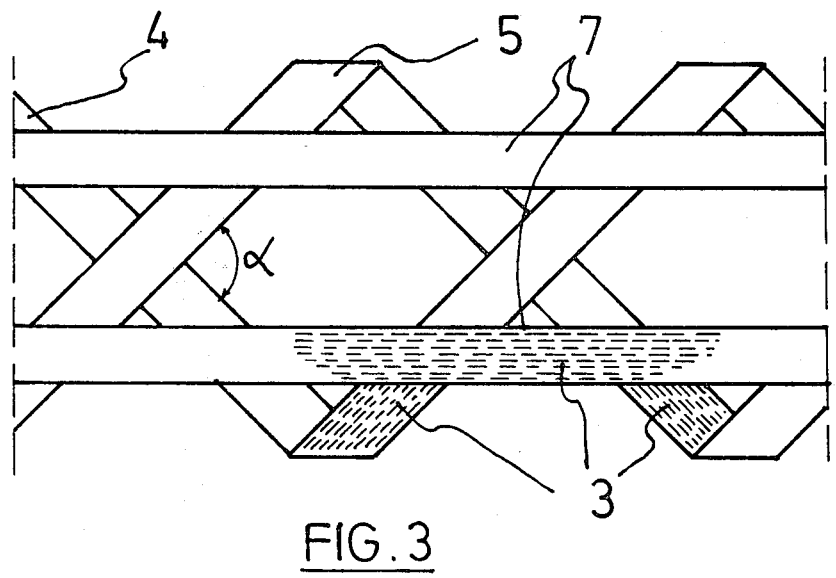
FIG. 3 is a view of a variant of the grid structure.

A grid structure which forms a convenient compromise as far as dampening capacity and torsional strength increase and low weight are concerned is shown in FIG. 3. The grid structure comprises two series of intersecting strips 4, 5 at an angle of 90°. A third series of parallel strips 7, however, extends according to the direction in the laminate which is mostly exposed to vibrations and which requires most dampening. For a ski the strips 7 will extend along the longitudinal direction of the ski. However, the strips 4, 5 which each form an angle of 45° to the longitudinal axis of the ski will raise the torsional strength and torsional dampening capacity considerably.

FIG. 4 shows a top plan view of a ski 8. A grid structure 2 may for example be provided in the central zone of the ski at the underside of its core 1 and have a length of 30 to 50 cm and with three strips series 4, 5, 7 as described above (see also cross-section in FIG. 5). The longitudinal strips 7 will hereby stimulate the longitudinal dampening capacity and the strips 4 and 5 will do so for the torsional strength and torsional dampening capacity. It is also possible to apply two different dampening structures to the upper and bottom sides. For example, it is possible to provide a grid structure at the upper side of the ski core layer as shown in FIG. 1, either throughout a part or throughout the full length of the ski, and a longitudinal reinforced rubber layer at the underside of the ski to improve the dampening. It will depend upon the buildup and application of the laminate where the grid structures must be applied, which dimensional proportions and intersecting angles are optimal, and whether a combination with other dampening measures or torsional-strength-increasing layers is desirable.

Dampening strips and/or torsional-strength-increasing sheets 9, 10 can also be applied near the tip or aft end of the ski as suggested in FIG. 4. The angle α between the strip series 4, 5, as well as the proportion of the strip width to the strip spacings "a" can be adapted to the position of the grid in the ski. However, if desired, the angle α can gradually be changed in the same grid 9, 10 from one grid end to another. At the same time the strip width and spacings "a" can be varied in order to obtain a very specific and optimal dampening and strength behaviour adapted to the ski buildup. The ski 8 will further comprise the usual reinforcing layers 11 which enclose the core structure 1 as shown in FIG. 5, as well as a finishing layer 12 on top and a sole layer 13 fixed near its longitudinal edges against the steel edges 14.

I claim:

1. An energy-absorbing laminate comprising at least one layer (1) of a stiff material which on at least one of its plane sides throughout a part of its surface is covered with an elastomer layer (2) in which twisted fiber bundles (3) are embedded, characterized in that this elastomer layer (2) is in the form of a grid structure, built up of at least two series of substantially parallel elastomer strips (4, 5) reinforced with twisted fiber bundles (3), which strips intersect at an angle α between 10° and 120° and which are bonded to one another in the common contact areas (6).

2. A laminate according to claim 1, characterized in that the width of the strips (4, 5) is between 20% and 120% of the spacing "a" between successive substantially parallel strips.

3. A laminate according to claims 1 or 2, characterized in that the strips (4, 5) are reinforced in the longitudinal direction with a series of steel cords (3).

4. A plate-shaped object, characterized in that it comprises a laminate according to claims 1, 2 or 3.

5. An object according to claim 4 in the form of a ski, characterized in that it comprises in its core a slat-shaped laminate according to one of the foregoing claims.

6. A grid structure as an intermediate product for the manufacture of an energy-absorbing laminate according to one of the claims 1, 2 or 3, characterized in that it is built up of at least two series of parallel elastomer strips (4, 5) which comprise twisted fiber bundles (3) and which intersect at an angle α between 10° and 120° and which are bonded to one another in the common contact areas (6).

* * * * *